United States Patent [19]

Kugele et al.

[11] 3,862,198

[45] Jan. 21, 1975

[54] CATALYZED REDISTRIBUTION OF ALKYLTIN HALIDES

[75] Inventors: Thomas G. Kugele; Duane H. Parker, both of Cincinnati, Ohio

[73] Assignee: Cincinnati Milacron Chemicals, Inc., Reading, Ohio

[22] Filed: Jan. 10, 1974

[21] Appl. No.: 432,396

[52] U.S. Cl............ 260/429.7, 252/426, 252/431 R
[51] Int. Cl. ............................................. C07j 7/22
[58] Field of Search ................................. 260/429.7

[56] References Cited
UNITED STATES PATENTS

| | | | |
|---|---|---|---|
| 3,519,665 | 7/1970 | Molt et al. ....................... | 260/429.7 |
| 3,297,732 | 1/1967 | Banks .............................. | 260/429.7 |
| 3,340,283 | 9/1967 | Gloskey ........................... | 260/429.7 |
| 3,414,595 | 12/1968 | Oakes .............................. | 260/429.7 |
| 3,415,857 | 12/1968 | Hoye................................ | 260/429.7 |
| 3,459,779 | 8/1969 | Neumann......................... | 260/429.7 |
| 3,519,667 | 7/1970 | Molt et al. ....................... | 260/429.7 |
| 3,651,108 | 3/1972 | Giannaccari et al............. | 260/429.7 |

FOREIGN PATENTS OR APPLICATIONS 1,146,435   3/1969   Great Britain

*Primary Examiner*—Arthur P. Demers
*Attorney, Agent, or Firm*—Cushman, Darby & Cushman

[57] ABSTRACT

Onium salts are employed as catalysts for redistribution of di- or tri-alkyl tin halides or tetra-alkyl tins with tin tetrahalide to form mono-alkyltin trihalides.

13 Claims, No Drawings

CATALYZED REDISTRIBUTION OF ALKYLTIN HALIDES

It is known to redistribute polyalkyltin halides or tetraalkyl tins or corresponding aryl or aralkyltin compounds with stannic halides to form monoalkyltin trihalides according to the equations:

$$R_4Sn + 3SnX_4 \rightarrow 4RSnX_3 \quad (1)$$

$$R_3SnX + 2SnX_4 \rightarrow 3RSnX_3 \quad (2)$$

$$R_2SnX_2 + SnX_4 \rightarrow 2RSnX_3 \quad (3)$$

where R is an alkyl group, e.g., of 1 to 12 carbon atoms, aryl or aralkyl and X is a halogen of atomic weight 19 to 127, i.e., fluorine chlorine, bromine, or iodine.

Trialkyltin halides and tetra-alkyltin are known to redistribute relatively readily with tin tetrahalides without a catalyst. However, the yields of monoalkyltin trihalides are not as outstanding when it is desired to convert a dialkyltin dihalide to a monoalkyltin trihalide. Thus, Grant and Van Wazer, *J. OrganoMetallic Chem.* Vol. 4, page 229 (1965) indicate that only a 71% conversion of stannic chloride is possible when reacting it with dimethyltin dichloride to form methyltin trichloride.

Langer, U.S. Pat. No. 3,454,610, July 8, 1969, shows obtaining a complex of methyltin trichloride and dimethyl sulfoxide by reacting dimethyltin dichloride with tin tetrachloride in the presence of dimethyl sulfoxide in yields of over 90% but the process requires large amounts of dimethyl sulfoxide and there is the expense of breaking up the complex.

Neumann U.S. Pat. No. 3,459,799, Aug. 5, 1969 discloses preparing alkyltin trihalides in good yields from dialkyltin dihalides and tin tetrahalide by using large amounts of phosphorus oxychloride or the like, preferably in the presence of phosphorus pentoxide, as catalysts.

It has now been found that increased yields in shorter periods of time can be attained by carrying out reactions (1), (2) and (3) above in the presence of an onium salt catalyst. While onium hydroxides can be used in place of the salts the hydroxide is converted in situ to the salt by the tin tetrahalide.

As tin tetrahalides there can be used tin tetrachloride, tin tetrabromide and tin tetraiodide.

As alkyltin starting materials there can be used tetramethyltin, tetraethyltin, tetra n-butyltin, tetraamyltin tetra n-octyltin, tetra isooctyltin, tetra 2-ethylhexyltin, tetra n-propyltin, tetra isopropyltin, trimethyl tin chloride, trimethyltin bromide, trimethyltin iodide, triethyltin chloride, triethyltin bromide, triethyltin iodide, tri n-propyltin chloride, tri n-propyltin bromide, tri n-propyltin iodide, tri n-butyltin chloride, tri n-butyltin bromide, tri n-butyltin iodide, tri sec. butyltin chloride, tri-isobutyltin bromide, tri n-octyltin chloride, tri n-octyltin bromide, tri n-octyltin iodide, tri isooctyltin chloride, tri isooctyltin bromide, tri isoctyltin iodide, tri 2-ethylhexyltin chloride, tri 2-ethylhexyltin bromide, tri 2-ethylhexyltin iodide, dimethyltin dichloride, dimethyltin dibromide, dimethyltin diiodide, diethyltin dichloride, diethyltin dibromide, diethyltin diiodide, di-n-propyltin dichloride, di-n-propyltin dibromide, di-n-propyltin diiodide, diisopropyltin dichloride, di-n-butyltin dichloride, di-n-butyltin dibromide, di-n-butyltin diiodide, diisobutyltin dichloride, di-sec butyltin dichloride, di-sec butyltin dibromide, diamyltin dichloride, dihexyltin dichloride, diheptyltin dichloride, di-n-octyltin dichloride, di-n-octyltin dibromide, di-n-octyltin diiodide, diisooctyltin dichloride, diisooctyltin dibromide, diisooctyltin diiodide, di-2-ethylhexyltin dichloride, di-2-ethylhexyltin dibromide and di-2-ethylhexyltin diiodide, di(dodecyltin) dichloride, di (dodecyltin) dibromide, tetrakis (dodecyl)tin, tris(dodecyl)tin chloride, tris(dodecyl)tin iodide, tetraphenyltin, triphenyltin chloride, triphenyltin bromide, triphenyltin iodide, diphenyltin dichloride, diphenyltin dibromide, diphenyltin diiodide, tribenzyltin chloride, tribenzyltin bromide, tribenzyltin iodide, tetrabenzyltin, dibenzyltin dichloride, dibenzyltin dibromide, dibenzyltin diiodide, tricyclohexyltin chloride, dicyclohexyltin dichloride, dicyclohexyltin dibromide, di(p-tolyltin) dichloride, tri(p-tolyltin) chloride, tetra p-tolyltin.

Preferably there is employed a dialkyltin dichloride, most preferably dimethyltin dichloride. With alkyl groups above methyl side reactions such as dehydrohalogenation occur which reduce the yield.

The products prepared by the invention include for example methyltin trichloride, methyltin tribromide, methyltin triiodide, ethyltin trichloride, ethyltin tribromide, ethyltin triiodide, n-propyltin trichloride, n-propyltin tribromide, n-propyltin triiodide, isopropyltin trichloride, n-butyltin trichloride, n-butyltin tribromide, n-butyltin triiodide, isobutyltin trichloride, sec. butyltin trichloride, sec. butyltin triiodide, n-amyltin tri-chloride, n-hexyltin trichloride, n-heptyltin trichloride, n-octyltin trichloride, n-octyltin tribromide, n-octyltin triiodide, isooctyltin trichloride, isooctyltin tribromide, isooctyltin triiodide, 2-ethylhexyltin trichloride, 2-ethylhexyltin tribromide, 2-ethylhexyltin triiodide, dodecyltin trichloride, dodecyltin tribromide, dodecyltin triiodide, phenyltin trichloride, phenyltin tribromide, phenyltin triiodide, cyclohexyltin trichloride, benzyltin trichloride, benzyltin tribromide, benzyltin triiodide, p-tolyltin trichloride.

The polyhydrocarbyltin compound and the tin tetrahalide are reacted in the proportions indicated in equations (1), (2) and (3) above.

As onium compounds there can be used compounds of the formula $R_4ZY$ where R is alkyl, e.g., alkyl of 1 to 18 carbon atoms, preferably 1 to 8 carbon atoms, most preferably methyl, aryl or aralkyl, Z is N, P or As and Y is an anion such as halogen of atomic weight 19 to 127, i.e., $F^-Cl^-$, $Br^-$ or $I^-$, sulfate, phosphate, nitrate, acetate trihalostannite, e.g., trichlorostannite, tribromostannite, triiodostannite.

Examples of catalysts are tetramethyl ammonium chloride, tetramethyl ammonium bromide, tetramethyl ammonium phosphate, tetramethyl ammonium trichlorostannite, tetramethyl ammonium acetate, tetramethyl ammonium nitrate, quaternary ammonium iodides, such as dimethyl diethyl ammoniun iodide, tetraethyl ammonium iodide, tetrapropyl ammonium iodide, tetrabutyl ammonium iodide, tetradodecyl ammonium iodide, tetraoctadecyl ammonium iodide, tetraphenyl ammonium iodide, tetrabenzyl ammonium iodide, octyl triphenyl ammonium iodide, methyl triphenyl ammonium iodide, dodecyl triphenyl ammonium iodide, phenyl ethyl tetramethylene ammonium iodide, phenyl ethyl pentamethylene ammonium iodide, tetra p-tolyl ammonium iodide, and the corresponding quaternary ammonium chlorides, bromides, sulfates, acetates, phosphates, nitrates and trihalostannites, e.g., dimethyl diethyl ammonium chloride, tetrapropylammonium chloride, tetrapropyl ammonium bromide, tetrabutyl ammonium chloride, tetrabutyl ammonium bromide, tetrabutyl ammonium sulfate, tetraoctyl ammonium acetate, tetraoctyl ammonium chloride, tetraoctyl ammonium bromide, tetrabenzyl ammonium chloride, tetraphenyl ammonium chloride, methyl triphenyl ammonium chloride, phosphonium iodides such as tetramethyl phosphonium iodide, tetraethyl phosphonium iodide, tetrapropyl phosphonium iodide, tetrabutyl phosphonium iodide, tetraisopropyl phosphonium iodide, tetraoctyl phosphonium iodide, tetradodecyl phosphonium iodide, tetraoctadecyl phosphonium iodide, tetraphenyl phosphonium iodide, tetrabenzyl phosphonium iodide, octyl triphenyl phosphonium iodide, methyl triphenyl phosphonium iodide, dodecyl triphenyl phosphonium iodide, phenyl ethyl tetramethylene phosphonium iodide, tetra p. tolyl phosphonium iodide, and the corresponding phosphonium chlorides, bromides, acetates, sulfates, nitrates and trihalostannites, e.g., tetramethyl phosphonium chloride, tetramethyl phosphonium bromide, tetramethyl phosphonium sulfate, tetramethyl phosphonium acetate, tetrabutyl phosphonium chloride, tetrabutyl phosphonium bromide, tetrabutyl phosphonium acetate, tetraoctyl phosphonium chloride, tetraphenyl phosphonium chloride, tetraphenyl phosphonium bromide, tetraphenyl phosphonium sulfate, tetrabenzyl phosphonium chloride, arsonium salts such as tetramethyl arsonium chloride, tetramethyl arsonium bromide, tetramethyl arsonium iodide, tetramethyl arsonium sulfate, tetramethyl arsonium acetate, tetrabutyl arsonium chloride, tetraoctyl arsonium chloride, tetraoctyl arsonium bromide, tetraoctyl arsonium iodide, tetraoctyl arsonium sulfate, tetraphenyl arsonium chloride, tetraphenyl arsonium iodide.

The amount of catalyst employed can be from 0.001 to 0.5 mole per mole of dialkyltin dihalide (or other alkyltin compound) used. The reaction rate goes up with increasing amount of catalyst, e.g., with 0.05 mole of tetramethyl ammonium chloride catalyst to 2 moles of $SnCl_4$ and 2 moles of $(CH_3)_2 SnCl_2$ the reaction rate is 14 times the uncatalyzed rate while if the amount of catalyst is increased to about 1% of the $SnCl_4$ by weight (about 0.1 mole of catalyst) the rate is 27 times as fast as the uncatalyzed rate. Normally the catalyst is employed in an amount not over 5 mole % of the alkyltin compound starting material. High amounts can be used but are wasteful on an economic basis.

The reaction is normally carried out at a temperature of 150° to 300°C. for 0.5 to 20 hours.

Since the compound $RSnX_3$ can decompose as follows:

$$RSnX_3 \rightleftharpoons RX + SnX_2$$

it is desirable to have the corresponding alkyl halide present in the reaction vessel, e.g., a small amount of methyl chloride is added, to suppress this side reaction. It is not essential to add the alkyl halide or other RX compound, however, since there will only be a relatively small loss in yields if the reaction is carried out in a closed system, but as indicated purging the vessel with the RX compound and pressurizing the reaction vessel with the RX compound will improve the overall yields. Elevated pressures are employed only to contain materials which boil below the reaction temperatures.

Unless otherwise indicated all parts and percentages are by weight.

EXAMPLE 1

Into a stirring autoclave is placed 520 grams (2.0 mole) of $SnCl_4$, 440 grams (2.0 mole) of $(CH_3)_2 SnCl_2$ and 5.5 grams (0.05 mole) of tetramethyl ammonium chloride were heated to 200°C. and then 15 grams of methyl chloride were added and system heated at 200°C. for 5 hours. The reaction product was cooled to about 85°C., a sample taken and the yield of $CH_3Sn Cl_3$ determined as 98.3%, yield 955 grams.

EXAMPLE 2

The procedure of example 1 was repeated using 2.0 moles of dibutyltin dichloride in place of the dimethyltin dichloride. After 4 hours the yield of butyltin trichloride was 30%. Additional heating time tended to decrease the yields of butylin trichloride due to decomposition. Thus the yield was reduced to below 10% after a total reaction time of 6 hours.

It should be realized that the onium compounds need not be added as such but can be formed in situ. That if mono, di or trialkyl or aryl amines or mono, di and tri alkyl or aryl phosphines are added they will form the corresponding ammonium or phosphonium halides under the reaction conditions.

What is claimed is:

1. In a process of reacting a tin compound of the group consisting of (1) $R_4Sn$, (2) $R_3SnX$ and (3) $R_2SnX_2$ with $SnX_4$ to form $RSnX_3$ where R is hydrocarbyl and X is a halogen of atomic weight 19 to 127, the improvement comprising carrying out the reaction in the presence of an onium salt catalyst of the formula $R'_4ZY$ where R' is alkyl, aryl or aralkyl, Z is N,P or As and Y is an anion.

2. A process according to claim 1 wherein R is alkyl, aryl or aralkyl and the reaction is carried out at 150° to 300°C.

3. A process according to claim 1 wherein X is chlorine.

4. A process according to claim 2 wherein R is alkyl of 1 to 12 carbon atoms, phenyl, tolyl or benzyl, $R^1$ is alkyl of 1 to 18 carbon atoms, phenyl, tolyl or benzyl and Y is halogen of atomic weight 19 to 127, sulfate, nitrate, phosphate, acetate or $Sn X_3^-$.

5. A process according to claim 4 wherein the catalyst is employed in an amount of 0.001 to 0.5 mole per mole of tin compound (1), (2) or (3).

6. A process according to claim 5 wherein the tin compound is (3).

7. A process according to claim 6 wherein R is methyl.

8. A process according to claim 7 wherein Z is N.

9. A process according to claim 8 wherein all four $R^1$ groups are methyl.

10. A process according to claim 9 wherein the catalyst is used in an amount of 0.001 to 0.05 mole per mole or $R_2SnX_2$.

11. A process according to claim 9 wherein X is chlorine.

12. A process according to claim 5 wherein X is chlorine.

13. A process according to claim 5 wherein R is alkyl of 1 to 8 carbon atoms.